Sept. 11, 1962 W. E. BURNHAM 3,053,267
CONTROLLABLE PITCH PROPELLER
Filed Dec. 4, 1957 3 Sheets-Sheet 1

INVENTOR.
WALTER E. BURNHAM
BY
Marechal, Biebel, French & Bugg
ATTORNEYS

Sept. 11, 1962 W. E. BURNHAM 3,053,267
CONTROLLABLE PITCH PROPELLER
Filed Dec. 4, 1957 3 Sheets-Sheet 2

INVENTOR.
WALTER E. BURNHAM
BY
Marechal, Biebel, French & Bugg
ATTORNEYS

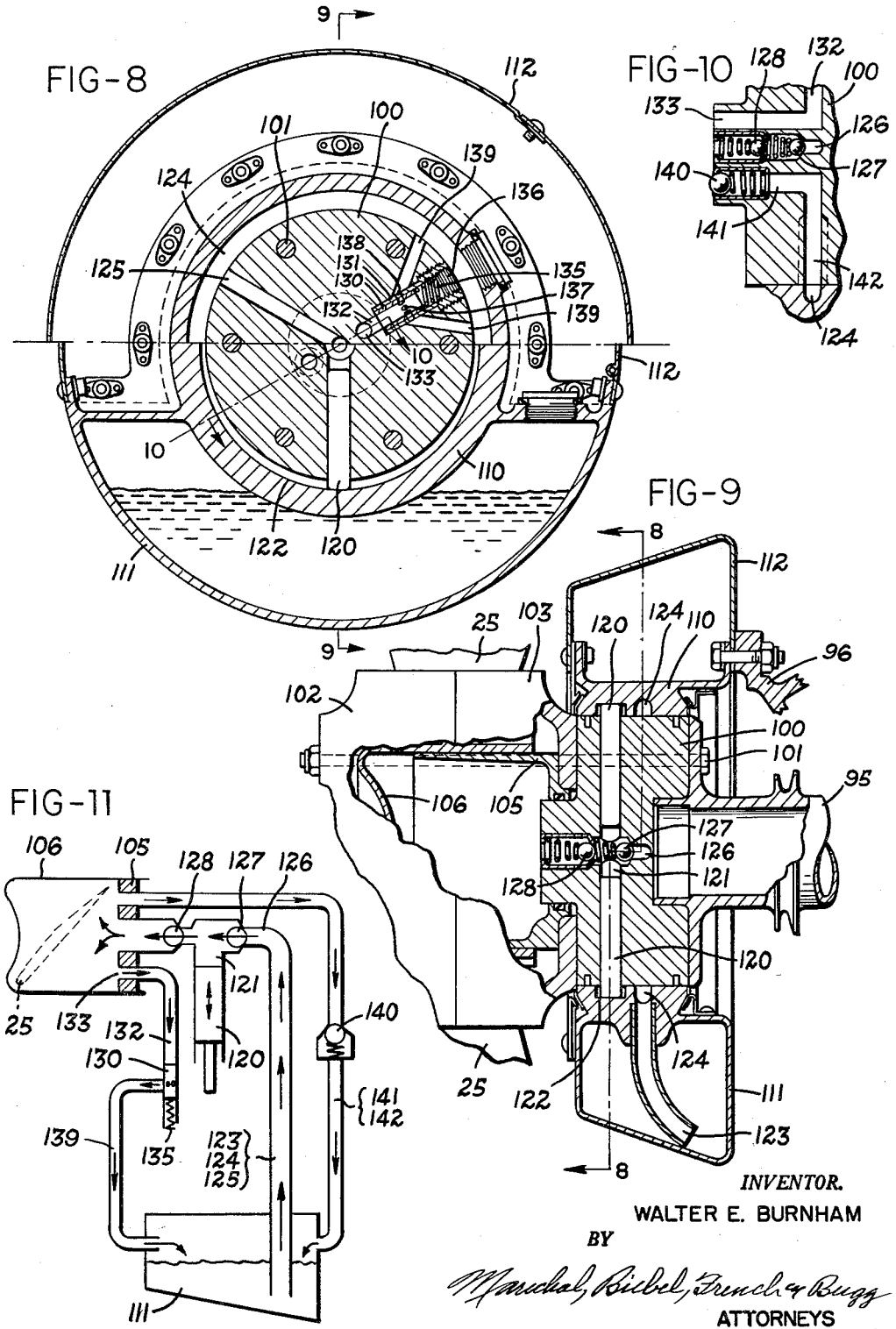

United States Patent Office
3,053,267
Patented Sept. 11, 1962

3,053,267
CONTROLLABLE PITCH PROPELLER
Walter E. Burnham, Wichita, Kans., assignor to McCauley Industrial Corporation, Dayton, Ohio, a corporation of New York
Filed Dec. 4, 1957, Ser. No. 700,658
2 Claims. (Cl. 137—56)

This invention relates to controllable pitch propellers for aircraft.

The invention is particularly related to a control system for an adjustable pitch propeller, and it is especially applicable to a control system for maintaining the engine speed effectively constant in flight. More specifically, the invention relates to propeller control systems in which hydraulic fluid is employed to change the blade pitch in accordance with engine speed.

In any propeller control system, it is important to have maximum reliability over a substantial range of operating temperatures, having in mind the comparatively wide temperature changes which can take place between ground level and the altitudes at which the plane may operate in flight. Hydraulic systems are particularly sensitive to changes in temperature, since the viscosity of the hydraulic fluid is subject to change as the temperature decreases, and if such change is sufficient to cause the fluid to become sluggish, or even to tend to congeal, particularly at high altitudes, this will seriously reduce the sensitivity of the system. It is also important, especially on light aircraft, that the propeller control system be as simple and economical as possible, from the standpoint of weight as well as initial cost and maintenance.

It is a primary object of this invention to provide a control system for an adjustable pitch aircraft propeller which is of improved and simple construction which will function to maintain a preset engine speed over a wide range of service temperatures, and which has special applicability to aircraft of the remotely controlled type such as target planes as well as to pilot controlled aircraft.

Another object of the invention is to provide a propeller control system as outlined above which is hydraulically operated and which is entirely contained in the rotating hub structure of the aircraft.

An additional object of the invention is to provide a propeller control system as outlined above wherein the hydraulic fluid which operates the pitch-changing mechanism is continuously circulated through the entire system while maintaining an effectively constant adjusted pitch position of the propeller and thus has minimum tendency for congealing even under low temperature conditions encountered when flying at high altitudes.

It is also an object of the invention to provide a propeller control system having the above characteristics and advantages which is readily adjustable on the ground to change the preset engine speed to be maintained in flight.

Further objects and advantages of the invention will be apparent from the following description, the accompanying drawings and the appended claims.

In the drawings:

FIG. 8 is a radial section on the line 8—8 of FIG. 9 showing another hub structure incorporating a control system in accordance with the invention which includes a piston type pump;

FIG. 9 is a section on the line 9—9 of FIG. 8;

FIG. 10 is a fragmentary section on the line 10—10 of FIG. 8; and

FIG. 11 is a hydraulic diagram illustrating the operation of the control system of FIGS. 8–10.

Figure 1:
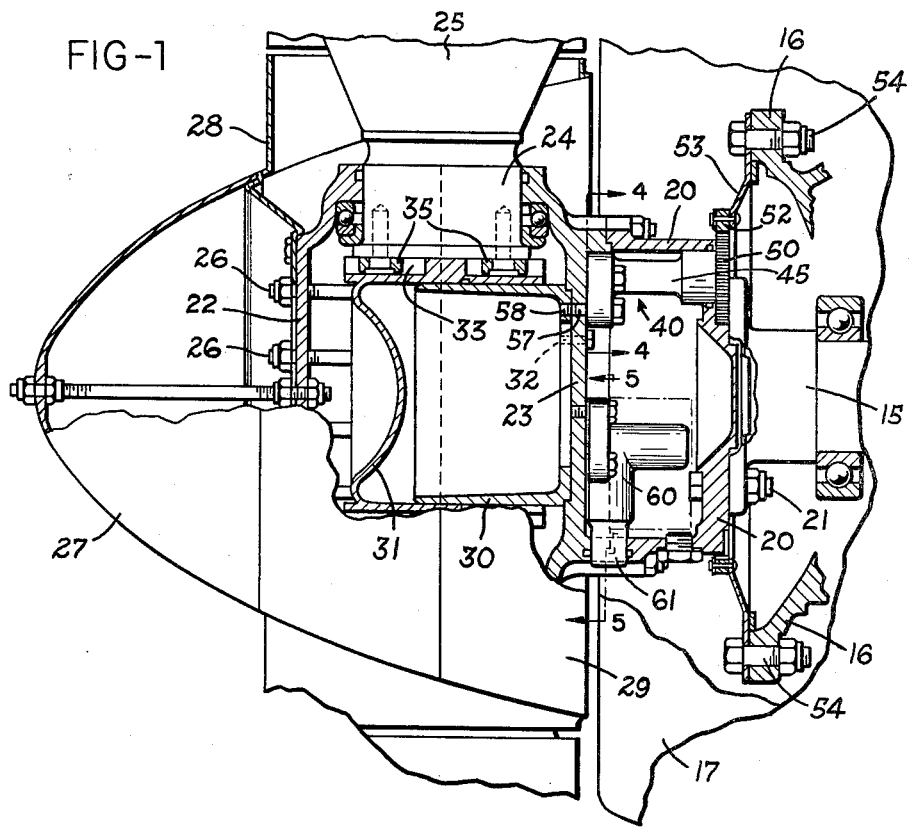
FIG. 1 is a fragmentary view partly in side elevation and partly broken away in axial section showing an adjustable pitch propeller hub structure incorporating a control system in accordance with the invention.

Referring to the drawings, which illustrate preferred embodiments of the invention, FIG. 1 shows fragments of the engine drive shaft 15 and the engine nose 16 within the engine cowl 17. The engine drive plate 20 is secured as by bolts 21 on the forward end of the drive shaft 15 and carries the other parts which form therewith the rotating hub structure. The other major parts of this assembly are the forward and aft sections 22 and 23 of the hub shell in which the roots 24 of the blades 25 are mounted. These shell sections are secured together and to the drive plate 20 as by means of bolts 26, and they carry the several sections 27, 28 and 29 of the spinner.

Figure 7:
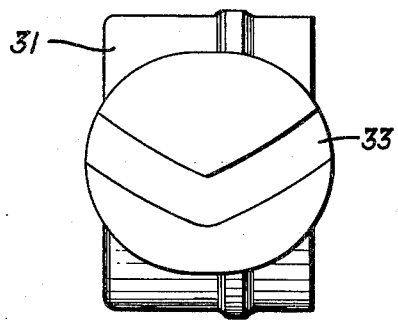
FIG. 7 is a detail elevational view of the outside of the piston which forms a part of the control mechanism in FIG. 1.

The blade roots 24 are mounted for rotation in the hub shell 22—23 for pitch changing purposes under the control of a hydraulic motor comprising a single-acting hydraulic cylinder 30 and piston 31. The cylinder 30 is secured as by bolts 32 to the aft hub section 23, and the piston 31 is cup-shaped for telescoping movement over the cylinder 30. As shown in FIG. 7, on opposite outer sides of the piston 31 is a cam track 33 which cooperates with a pair of follower rollers 35 mounted on the inner end of the adjacent blade root 24, and the arrangement is such that forward movement of piston 31, to the left as viewed in FIG. 1, will rotate the blades in the direction to increase their pitch.

In operation, centrifugal blade torque will tend to urge the blades 25 to minimum pitch position, and the invention provides a hydraulic system which is entirely contained within the rotating hub structure for moving the blades towards increased pitch position in accordance with engine speed. This system includes a positive displacement pump indicated generally at 40 for supplying hydraulic fluid from a supply within the engine drive plate 20 to the interior of the cylinder 30. The drive plate 20 is therefore generally cup-shaped to form a sump for the fluid supply, and it is secured in sealed relation with the aft hub shell section 23.

The pump 40 is a gear pump incorporating pump gears 41 and 42 supported respectively on an idler shaft 43 and drive shaft 44 within the pump housing 45. This pump assembly is mounted within the drive plate 20, with the forward end of housing 45 secured in sealed relation with the back face of hub shell section 23 by bolts 46 and a gasket 47. The rearward end of housing 45 extends through a passage 48 in the drive plate 20 and is provided with an O-ring seal 49. The pump drive shaft 44 extends to the back of drive plate 20 and carries at its outer end a drive gear 50 positioned in a recess 51 in the rear surface of the drive plate 20, and this gear 50 meshes with a ring gear 52 carried by an annular plate 53 bolted at 54 on the stationary engine nose 16. The pump 40 is accordingly driven when the engine is operating to rotate the hub structure.

Figure 3:
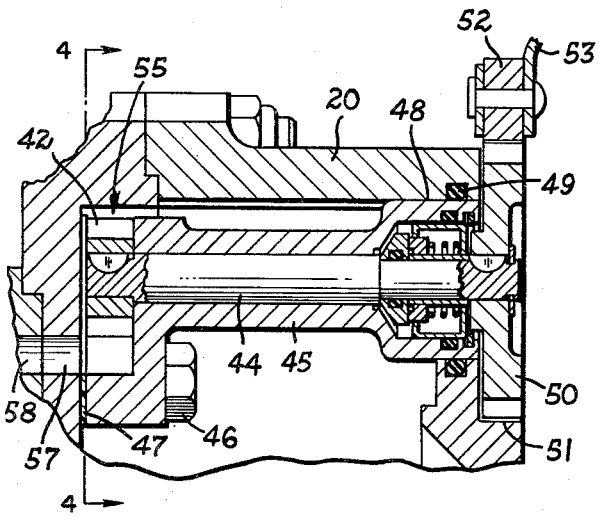
FIG. 3 is an enlarged fragmentary section taken on the line 3—3 of FIG. 4 and showing the construction of the gear pump which forms a part of the system of FIG. 1.
Figure 4:
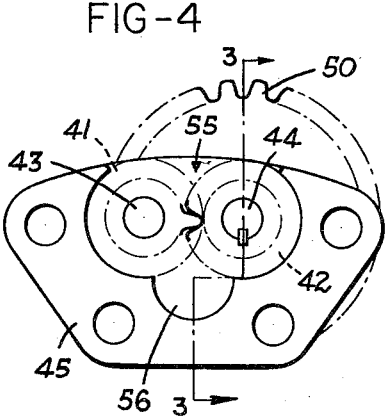
FIG. 4 is an end elevation of the pump assembly in FIG. 3 looking in the direction indicated by the line 4—4 of FIGS. 1 and 3.

As shown in FIGS. 3 and 4, the pump housing 45 is open at 55 in the portion overlying the radially outer nip of the pump gears 41 and 42 for direct access by the hydraulic fluid supply within the drive plate 20. The end of the housing 45 is also open in the area overlying the outer ends of the gears 41 and 42, and this opening is extended to form a port 56 overlying the output side of the pump gears which matches ports 57 and 58 in the hub shell section 23 and the bottom of the cylinder 30 for conducting the output of the pump directly to the interior of the cylinder 30.

With this pump arrangement as just described, whenever the engine is in operation, the pump will be driven to supply hydraulic fluid continuously and directly to the interior of cylinder 30. If, therefore, discharge of this fluid from the cylinder is blocked, pressure will be developed for causing the piston 31 to move outwardly and thereby to adjust the blades 25 toward increased pitch position. In accordance with the invention, a control valve is provided which does block escape of fluid from within the cylinder 30 whenever the engine speed exceeds a desired range, but which opens sufficiently at the desired engine speed to effect continuously controlled relief of the pressure in the cylinder in such relation with the output of the pump as to retain the blades in the proper increased pitch position.

Figure 5:
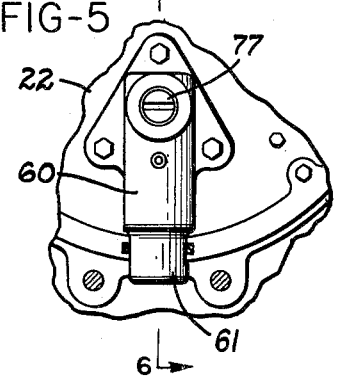
FIG. 5 is a fragmentary elevational view taken as indicated by the line 5—5 in FIG. 1 and showing the governor assembly in the control system of FIG. 1.
Figure 6:
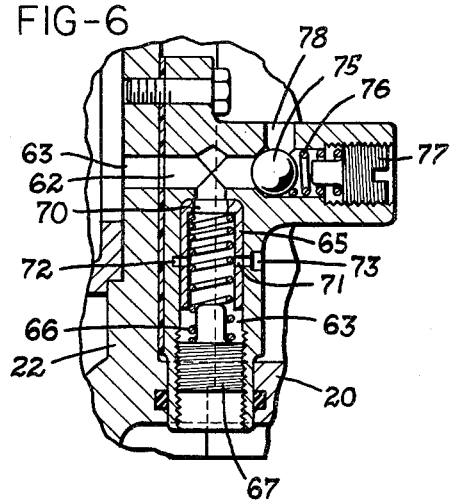
FIG. 6 is an enlarged fragmentary section on the line 6—6 of FIG. 5.

Referring particularly to FIGS. 1, 5 and 6, the control valve assembly includes a housing 60 bolted on the rear face of the hub shell section 23 within the engine drive plate 20 and including a cylindrical portion 61 which extends radially outwardly through matching recesses in the mating portions of the shell section 23 and the drive plate 20. A bore 62 in the housing 60 matches a port 63 leading through the wall of the part 23 to the interior of the cylinder 30, and the port 62 connects within the housing 60 with a valve chamber 63 containing a thimble-shaped sleeve valve 65 and cooperating spring 66 which is in turn provided with a threaded adjusting screw 67.

FIG. 6 shows the valve 65 in the position it assumes when the engine is at rest or is operating appreciably below its preset control speed. In this position, the valve 65 is held by spring 66 at the inner end of chamber 63, and there is then free communication from the passage 62 to the inside of valve 65 by way of its inner end port 70 and thence through its radial ports 71 and the groove 72 in the wall of chamber 63 to the discharge port 73 which opens directly into the interior of the sump within drive plate 20. The valve 65 can move outwardly, however, under the action of centrifugal force and against the biasing force of spring 66 to a position wherein the ports 71 are fully closed, and in this position of the valve, the discharge from within cylinder 20 is totally blocked and the piston 31 will therefore be forced to move in the direction to increase pitch.

The housing 60 also incorporates a pressure relief valve for preventing the pressure within cylinder 30 from exceeding a desired maximum. This relief valve includes a ball 75 controlling a seat at the opposite end of passage 62 from port 63 and provided with a spring 76 and adjusting screw 77. When the ball 75 is forced away from its seat against spring 76, it opens a discharge port 78 into the interior of the drive plate 20.

Figure 2:
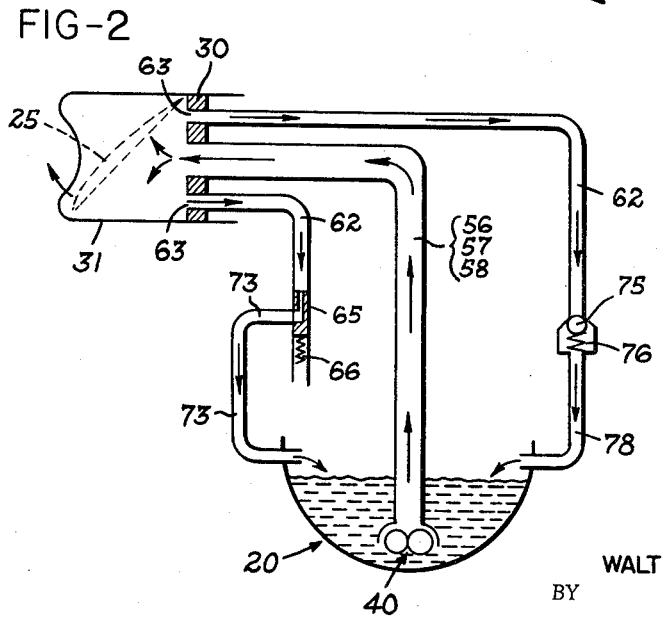
FIG. 2 is a schematic hydraulic diagram illustrating the operation of the invention.

FIG. 2 illustrates diagrammatically the operation of this entire control system. The pump 40 operates continuously to supply the hydraulic fluid directly into the interior of cylinder 30, but so long as the engine speed is below the desired range, the valve 65 will be in the open position shown in FIG. 2 so that the hydraulic fluid will circulate through cylinder 30 and thence back by way of port 73 to the sump. As the engine speed approaches the desired range, however, the valve 65 will move outwardly towards its closed position, thus progressively throttling discharge from the cylinder 30 and causing the pressure within the cylinder to rise sufficiently to move piston 31 in the direction to increase the pitch of the blades. If the engine speed should exceed the desired range, this throttling action will be complete, and the resulting rapid pressure rise will increase the blade pitch sufficiently to overload the motor until its speed has been reduced to a range at which valve 65 begins to open and thereby to permit escape of the pressure from the cylinder. In practice, therefore, after the desired altitude and engine speed have been reached, there will be alternating closing and opening movements of the valve 65 within a small range such that the blade pitch will remain effectively constant.

This control system is therefore very simple and at the same time is accurate and reliable. The engine speed to be maintained is simply preset by appropriate adjustment of the force of spring 66 by means of screw 67, and this setting will remain unchanged in flight but can of course be changed when the plane is on the ground. The system also offers the important advantage that all of the hydraulic fluid is continuously circulating through the entire system, instead of closing off that portion of the fluid which is in the operating cylinder when the engine reaches the control speed. In such latter system, the fluid in the closed portion thereof has the opportunity to stiffen when the aircraft is operating at altitudes where the temperature is sufficiently low to produce such stiffening effect on a stagnant oil supply, and the response of the system when a pitch change is needed will be correspondingly unreliable. In the system of the invention, however, the fluid is continuously circulated through the operating cylinder and is therefore maintained in adequately free-flowing condition.

FIGS. 8–11 show a hub structure embodying another form of control system in accordance with the invention which differs primarily from the system of FIGS. 1–7 in incorporating a reciprocating piston type pump rather than a gear pump. The engine drive shaft is shown fragmentarily at 95, and the fragment of the engine nose 96 corresponds to the fragments 16 in FIG. 1. The rotor body 100 corresponds in function to the engine drive plate 20 in FIG. 1, and it is directly secured as by bolts 101 to the flanged forward end of the shaft 95. The hub shell sections 102 and 103 correspond to the parts 22 and 23 and are secured on the rotor 100 as by bolts 101. The cylinder 105 similarly corresponds to the cylinder 30 and cooperates with the piston 106 to adjust the pitch of the blades 25.

The rotor 100 rotates within an annular stator housing 110 which is secured on a stationary part of the engine such as the nose 96 as shown. The stator housing 110 includes on its lower side a sump 111 or reservoir for containing the hydraulic fluid supply to operate the hydraulic motor. A cowl section 112 is bolted around the upper part of the stator housing to complete the outline partially formed by the sump 111.

The positive displacement pump for supplying the hydraulic fluid from the sump 111 to the cylinder 105 includes a pair of pistons 120 mounted for reciprocating movement in a diametral bore 121 in the rotor 100. The outer ends of pistons 120 ride on an eccentric cam track 122 extending around the inner circumference of the stator housing 110. The suction line to these pump pistons includes a suction tube 123 extending from within the sump 111 to a circumferential channel 124 in the inner wall of the stator 110. A passage 125 leads from the channel 124 to the inner end of a bore 126 in the rotor 100, and an inlet check valve 127 controls passage from the bore portion 126 to the center of the bore 121. An outlet check valve 128 in turn controls the discharge connection from the center of the bore 121 to the interior of the cylinder 105.

With this construction, the pump pistons 120 will reciprocate as the rotor 100 rotates within the stator 110 and thus provide an effectively continuous supply of hydraulic fluid to the cylinder 30. The discharge of this fluid from within the cylinder 105 is controlled by a governor valve assembly which is also carried by the rotor 100 and includes a sleeve valve 130 mounted for sliding movement in a bushing 131 fixed in a radial bore 132 in the rotor 100 which connects at its inner end through a bore 133 directly to the cylinder 105. A spring 135 having an adjusting screw 136 normally biases the valve 130 to its innermost position in which the ports 137 therein connect with ports 138 in the sleeve 131 and thence with passages 139 leading directly to the channel 124.

The operation of this form of the invention is therefore essentially the same as that already described in connection with FIGS. 1-7. When the engine is operating below its preset control speed determined by the setting of the screw 136, the fluid being supplied to the interior of the cylinder 105 can continuously discharge by way of valve 130 and passages 139 so that the propeller blades will remain in low pitch position. As the engine approaches or passes its control speed, the valve 130 will move outwardly against spring 135 to cause progressive closing of the ports 137 and thus to produce an increase of pressure within the cylinder 105 causing piston 106 to move outwardly and thus to increase the pitch of the blades. The rotor 100 also carries a pressure relief valve comparable to the valve 75 and comprising a spring-loaded ball 140 controlling access from within cylinder 105 to a bore 141 in rotor 100 from which a radial bore 142 leads directly to the channel 124.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A centrifugal hydraulic propeller governor valve for a constant speed propeller, comprising a valve housing adapted for mounting for rotation offset from an axis of rotation and having means defining an open ended bore extending substantially radially of the axis of rotation, means in said housing defining an oil inlet port opening into the inner end of said bore, means in said housing further defining an outlet port extending generally radially from a location in said bore intermediate the ends thereof, a sleeve valve reciprocably received in said bore and having open opposite ends with means at the inner end thereof for receiving the inner end of a control spring, means in the wall of said valve defining an exit port adapted to register with said outlet port when said valve is seated at the inner end of said bore providing unrestricted flow from said inlet port through said valve and into said outlet port, a control spring proportioned to extend within said valve with an inner end thereof received by said spring receiving means, a threaded adjustable screw plug received in the open end of said cylinder bore and forming a seal therewith, said plug having an outer end thereof accessible for adjustment within said bore against said spring to control the force of the spring against said valve, and said valve being movable outwardly against said spring solely by centrifugal force thereon upon the rotation thereof about said axis to control the rate of fluid flow from said inlet port through said outlet port.

2. The valve of claim 1 including a pressure relief valve in said housing for preventing the occurrence of hydraulic fluid pressure in said bore in excess of a maximum pressure, and said relief valve including a ball arranged for movement generally parallel to said axis of rotation so as to be unaffected by centrifugal force.

References Cited in the file of this patent

UNITED STATES PATENTS

| | | |
|---|---|---|
| Re. 20,283 | Caldwell | Mar. 9, 1937 |
| 891,064 | Heathcock | June 16, 1908 |
| 1,632,803 | Ray | June 21, 1927 |
| 1,780,217 | Wiltse | Nov. 4, 1930 |
| 2,019,966 | Havill | Nov. 5, 1935 |
| 2,105,843 | Preston | Jan. 18, 1938 |
| 2,307,102 | Blanchard et al. | Jan. 5, 1943 |
| 2,377,350 | Marsh | June 5, 1945 |
| 2,403,532 | Hoover | July 9, 1946 |
| 2,512,803 | MacNeil et al. | June 27, 1950 |
| 2,664,906 | Lautzenhiser | Jan. 5, 1954 |
| 2,697,441 | Hobbs | Dec. 21, 1954 |
| 2,845,086 | Waterman | July 29, 1958 |
| 2,882,915 | Darnell | Apr. 21, 1959 |

FOREIGN PATENTS

| | | |
|---|---|---|
| 756,134 | Great Britain | Aug. 29, 1956 |